(No Model.)

D. TRUE.
CARRIAGE WRENCH.

No. 271,549. Patented Jan. 30, 1883.

WITNESSES
B. W. Williams.
Joseph Ashbaugh.

INVENTOR
David True,
by his atty,
Henry W. Williams

UNITED STATES PATENT OFFICE.

DAVID TRUE, OF SALISBURY, MASSACHUSETTS.

CARRIAGE-WRENCH.

SPECIFICATION forming part of Letters Patent No. 271,549, dated January 30, 1883.

Application filed May 12, 1882. (No model.)

*To all whom it may concern:*

Be it known that I, DAVID TRUE, of Salisbury, in the county of Essex and State of Massachusetts, have invented new and useful Improvements in Carriage-Wrenches, of which the following is a specification.

Figure 1:
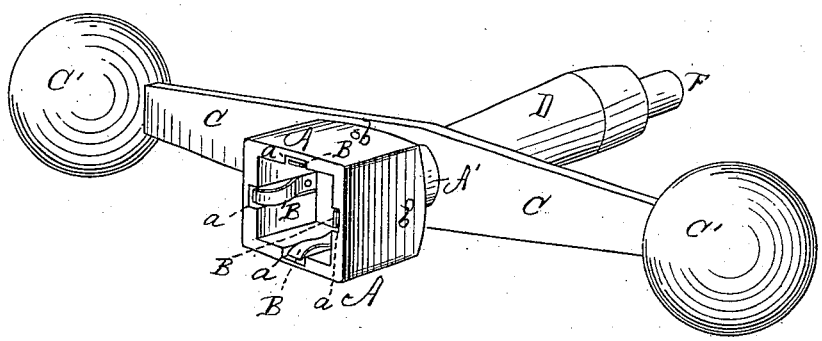
Figure 2:
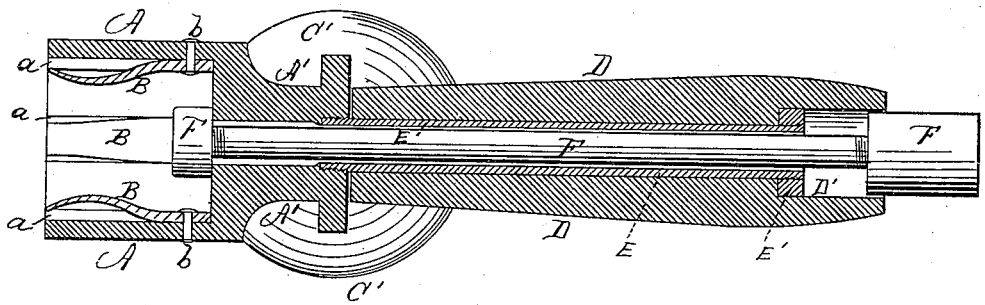

In the accompanying drawings, in which similar letters of reference indicate like parts, Figure 1 is a view in perspective of a carriage-wrench embodying my invention. Fig. 2 is a longitudinal section of the same.

A is a box provided with the shank A'. This box is provided with four grooves, a, one on each of its inner faces, and in each groove a is a spring, B, substantially of the shape shown, secured at or near one end to the box A by means of the rivet b.

Fixed to or integral with the shank A' of the box A is the bar C, having at each end the weights or balls C'. All the above-described parts are made preferably of metal.

Rigidly secured to the shank A' is a tubular rod—say of gas-pipe—E, provided at its outer end with an enlargement or ring, E'.

Loosely placed upon the tube E is the handle D, counterbored at D', so as to admit the ring E', and be prevented from coming off the tube E.

F is a plunger placed loosely in the tube E, and enlarged at both ends sufficiently to prevent its falling out.

The operation of the wrench is as follows: When a carriage-nut is to be removed the box A is pressed upon the nut, a slight tap is given to one of the balls C' to start the box A and nut, and then the balls are whirled, rotating of course the box A, shank A', and tube E, while the handle D remains stationary in the hand. The nut, after having been removed from the axle, remains in the box A, being held therein by the pressure of the springs B until it is knocked out by a tap upon the outer end of the plunger F. It will readily be seen that the nuts may be thus removed from the axles of a carriage very quickly and shot by the plunger into the hand, while, if desired, the nut may be allowed to remain in the box A until it is to be placed again on the axle. The extra leverage, adaptation for being started by a sudden tap, and convenience of being handled, render the balls C' upon the bar C much better for this purpose than a wheel. The use of springs on opposite sides of the box A render it capable of accommodating nuts of various sizes and securely holding them.

Having thus fully described this invention, what I claim, and desire to secure by Letters Patent, is—

1. In a carriage-wrench, the box A, having its inner faces provided with the longitudinal grooves a—i. e., grooves whose lines of direction are from the rear to the mouth of said box—each groove a being provided with a spring, B, secured to the box in its groove, and having its free end lying in the same, whereby the springs may perform their function without limiting the capacity of the box, substantially as and for the purpose set forth.

2. The herein-described improved carriage-wrench, consisting of the shank A', bar C, tipped with the balls C', box A, provided with the longitudinal grooves a, containing the springs B, handle D, counterbored at D', and tube E, provided with the ring E', all constructed and arranged as above described.

3. The herein-described improved carriage-wrench, consisting of the shank A', bar and balls C C', box A, provided with the longitudinal grooves a, containing the springs B, handle D D', an internal plunger for ejecting the nut from the said box, and the intermediate tube, E, placed loosely outside the plunger and inside the handle, all constructed and arranged substantially as and for the purpose set forth.

4. In combination with the box A of a carriage-wrench, provided with the springs B and suitable tube or passage, the plunger F, substantially as and for the purpose described.

DAVID TRUE.

Witnesses:
HENRY W. WILLIAMS,
JOSEPH ISHBAUGH.